UNITED STATES PATENT OFFICE.

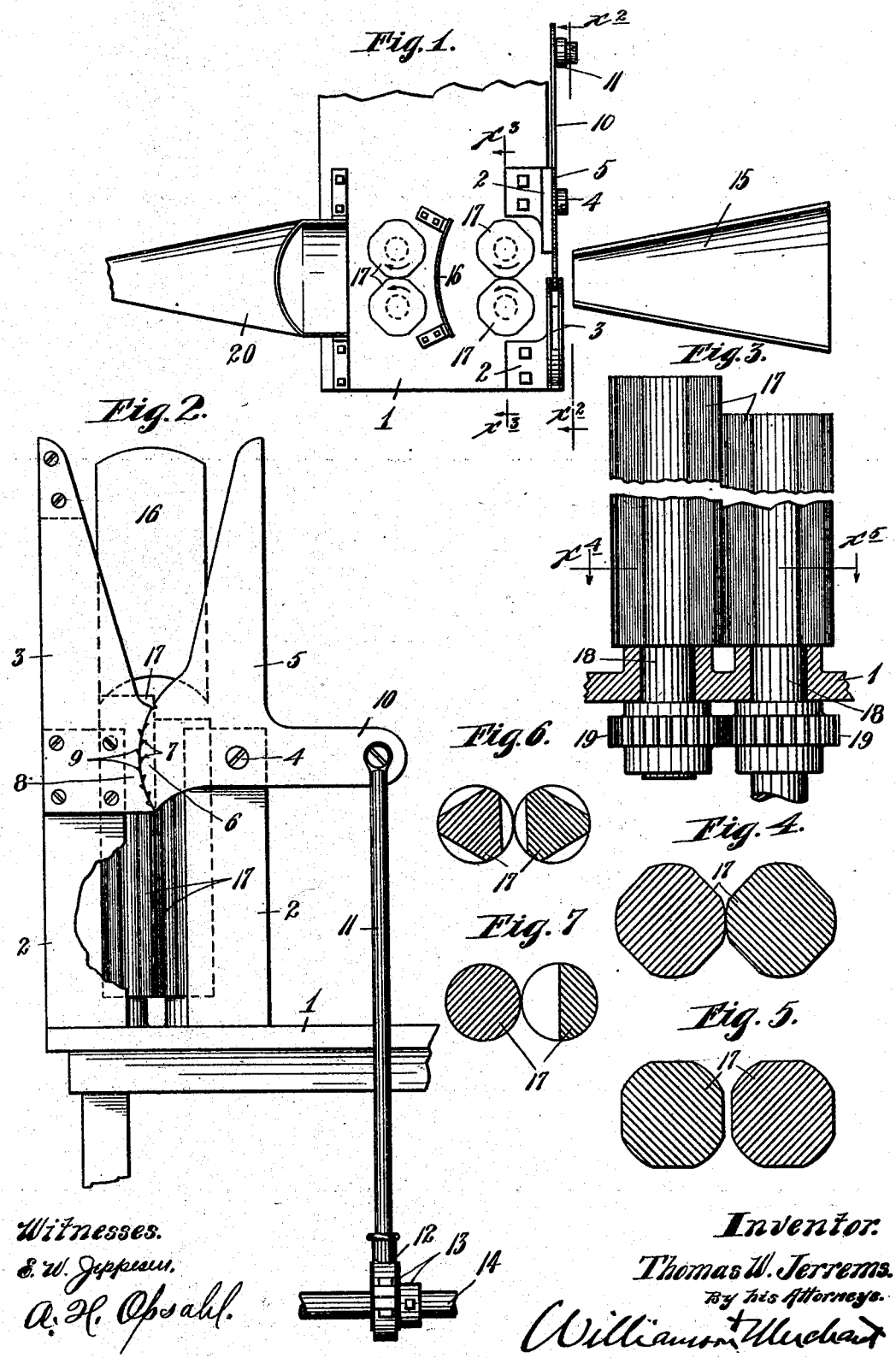

THOMAS W. JERREMS, OF ST. PAUL, MINNESOTA.

GRASS-TWINE MACHINE.

932,708.

Specification of Letters Patent. Patented Aug. 31, 1909.

Application filed May 24, 1906. Serial No. 318,525.

*To all whom it may concern:*

Be it known that I, THOMAS W. JERREMS, a citizen of the United States, residing at St. Paul, in the county of Ramsey and State of Minnesota, have invented certain new and useful Improvements in Grass-Twine Machines; and I do hereby declare the following to be a full, clear, and exact description of the invention, such as will enable others skilled in the art to which it appertains to make and use the same.

My invention relates to grass twine machines, and has for its object to provide an improved grass feeding mechanism therefor.

To the above ends the invention consists of the novel devices and combinations of devices hereinafter described and defined in the claims.

The invention is illustrated in the accompanying drawings, wherein like characters indicate like parts throughout the several views.

Referring to the drawings: Figure 1 is a plan view with some parts broken away showing the improved grass feeding mechanism. Fig. 2 is a front elevation of the grass feeding mechanism shown in Fig. 1, some parts being broken away, and those parts which are at the right of the line marked $x^2$ $x^2$ of Fig. 1 being removed. Fig. 3 is a view partly in elevation and partly in section on the line $x^3$ $x^3$ of Fig. 1. Figs. 4 and 5 are horizontal sections taken on the line $x^4$ $x^4$ of Fig. 3, illustrating different positions of the feed rollers; and Figs. 6 and 7 are views corresponding to Fig. 5 illustrating a modified form of the feed rollers.

The numeral 1 indicates a table or similar support, on the front portion of which is rigidly secured a pair of laterally spaced standards 2. To one of these standards is secured a laterally spaced pair of feed blades 3, and to the other of said standards is pivoted, at 4, a vibrating feed plate 5. The upper portion of the vibratory feed plate 5 diverges upwardly from the upper portions of the feed blades 3, so as to form a crotch which is adapted to receive and guide the abutting ends of the grass blades, not shown. The lower portion of the vibrating feed plate 5 has a segmental convex portion 6 which is formed with teeth or serrations 7, and the lower portions of the two laterally spaced plates 3 are provided with segmental concave portions 8, that are formed with teeth or serrations 9. The toothed portion of the plate 5 is underlapped slightly between the toothed portions of the plates 3 and the blades shown in Fig. 1.

The vibratory feed plate 5 is provided with an arm 10, to which is attached the upper end of a clamp rod 11, the lower end of which has an eccentric strap 12 that works on an eccentric 13 carried by a countershaft 14; which countershaft is suitably mounted and suitably driven in any well known manner, not necessary for the purposes of this case to consider. It is only necessary to state that under a rotary movement of the shaft 14, the blade 5 will be vibrated; and under the coöperating action of the toothed segmental surfaces of the plates 3 and 5 the butt ends of the grass will be fed laterally downward in an even order of succession from the bottom of the crotch formed by the diverging upper portions of said plates. The feed plates above described constitute what I designate as a primary grass feeding device.

To assist in holding the grass blades in the crotch formed by the upper portions of the blades 3 and 5, I have shown a trough-like holder 15, which is located in front of the said crotch, and is properly supported by means not shown. The numeral 16 indicates a stop plate against which the abutting ends of the grass blades are pressed when they are passed within the holder 15, and within the crotch formed by the upper portions of the feed blades 3 and 5. This stop plate 16 is suitably supported from the table 1.

The so-called secondary feed device of this grass feeding mechanism involves an arrangement of feed rollers of novel construction, and these rollers are adapted to receive the grass blades that are fed laterally thereto by the primary feed device, and to impart endwise feeding movements to the grass blades delivered thereto. These feed rollers 17, which are preferably arranged in two pairs set one ahead of the other and in upright positions, are made segmental in cross section. In Figs. 1 to 5 inclusive the said feed rollers 17 are formed with four flat vertical or longitudinal surfaces and with four intervening segmental surfaces; and they are so arranged that the segmental surfaces of the two coöperating rollers will run together, while the flattened surfaces thereof will separate and thus permit the grass blades to drop laterally down between the two rollers. As shown, the said rollers are provided, at their lower ends, with depending shafts 18 that are journaled in suitable bearings on the table 1, and are geared to run synchronously in reverse directions, by intermeshing gears 19 applied one to each of said shafts. One of the said shafts of each pair of rollers should be positively driven by means not shown.

As shown in Fig. 1, the feed rollers 17 are located in pairs, one at the front and one at the rear of the stop plate 16. The said stop plate 16 should extend downward (very little, if any,) below the upper ends of the said rollers 17. The said rollers should be driven in the directions of the arrows marked thereon in Fig. 1. The numeral 20 indicates a tapered receiving support into which the grass blades are fed in an even stream or order of succession, and by which they are directed to the twine forming mechanism, not shown; and which twine mechanism may be of any suitable construction, many forms of which are well known and familiar to this art.

By reference to Figs. 2 and 3 it will be seen that the left hand member of the forward part of the feed rollers 17 extends above the upper end of the right hand coöperating roller; and by reference to Fig. 2 it will be seen that the abutting ends of the grass blades, when fed downward between the serrated edges of the feed plates 3 and 5, will be thrown directly against the upper end of this long roller, and will be guided thereby between the two rollers.

As is evident, the grass blades will be dropped between the coöperating feed rollers 17 when the flattened or cut-away surfaces of said rollers are turned inward or toward each other, and then said rollers will engage and feed the grass endwise when their segmental or uncut cylindrical surfaces are turned together. Hence it is evident that the said feed rollers feed the grass blades endwise with an intermittent action, but this intermittent action follows in such rapid succession that the feed movement of the grass blades is practically or in fact continuous. It is also important to note that the primary feed device or grass blade selector, which, in the preferred arrangement of the machine is afforded by the toothed blades 3 and 5, serves not only to deliver the grass blades laterally between the free or receiving ends of the segmental feed rollers, but positively feeds the grass blades downward between the segmental surfaces of said rollers. To accomplish this important result in connection with the segmental feed rollers, the so-called primary feed device or grass blade selector should be distinct from and independent of the feed rollers themselves. As is evident, these segmental feed rollers may take various forms in cross section. In Fig. 6 the rollers are shown as each provided with three flat and three segmental surfaces; and in Fig. 7 one of the rollers is shown as round in cross section, and the other is shown as provided with one flat and one cylindrical surface. Fig. 7 further illustrates the fact that it is not necessary in all cases that both of the rollers be made segmental in cross section. In fact, the so-called segmental or cylindrical surface of the rollers may be very greatly reduced, inasmuch as all that is necessary to a feeding action is that said coöperating rollers have some surfaces that are brought nearly or quite together to produce the feed movement of the grass, and are provided with other surfaces that separate from each other so as to permit the grass blades to drop or move laterally between the said rollers. In fact, the said rollers might be square or might have other polygonal form in cross section.

From the above it will be seen that the coöperating segmental feed rollers constitute an intermittently acting secondary feed device, and that the feed blades 3 and 5 constitute an intermittently acting primary feed device. The combination of intermittently acting primary and secondary feed devices I believe to be a broadly new feature, and it is herein claimed accordingly.

From the statements above made it will be understood that the expression "segmental rollers" is used in a very broad sense. It is not, of course, necessary in all cases that the segmental surfaces of the rollers extend from end to end thereof.

The grass feding mechanism above described has been put into actual use, and has been found highly efficient for the purposes had in view.

I claim as my invention:

1. In a grass twine machine, the combination with a pair of coöperating feed rollers, at least one of which is segmental in cross section, of a primary feed device arranged for coöperation with said rollers to feed the grass blades laterally to and between the segmental surfaces of said rollers and means for holding the grass subject to the action of the said primary feed device, substantially as described.

2. In a grass twine machine, the combination with a pair of coöperating feed rollers, at least one of which is segmental in cross section, said rollers being connected to rotate in reverse directions, of a primary feed device distinct from and independent of said rollers and arranged for coöperation therewith to feed the grass blades laterally to and for a considerable distance downward between the segmental surfaces of said rollers and means for holding the grass subject to the action of the said primary feed device, substantially as described.

3. In a grass twine machine, the combination with a pair of upright coöperating feed rollers journaled at their lower ends and left with a free entrance to their upper ends, at least one of which rollers is segmental in cross section, of a pair of primary feed devices distinct from and independent of said rollers arranged to feed the grass blades laterally to and for a considerable distance downward between the coöperating surfaces of said rollers and means for holding the grass subject to the action of the said primary feed device, substantially as described.

4. In a grass twine machine, the combination with an intermittently acting secondary feed device arranged to feed the grass blades endwise, of an intermittently acting primary feed device arranged to feed the grass blades laterally to said intermittently acting secondary feed device, substantially as described.

5. In a grass twine machine, the combination with a pair of coöperating feed rollers, at least one of which is segmental in cross section, said rollers constituting an intermittently acting secondary feed device adapted to feed the grass blades endwise, of an intermittently acting primary feed device arranged to feed the grass blades laterally between the coöperating surfaces of said rollers, substantially as described.

6. In a feed mechanism of the kind described, the combination with a relatively fixed feed plate having a toothed concave segmental surface, of a vibratory feed plate having a toothed convex segmental surface, said feed plates having diverging upper portions that form a crotch adapted to receive the grass blades and to direct the same to the toothed segmental surfaces of said feed plates, substantially as described.

In testimony whereof I affix my signature in presence of two witnesses.

THOMAS W. JERREMS.

Witnesses:
F. D. MERCHANT,
C. MACNAMARA.